F. G. PURINTON.
LIQUID MICROMETER INDICATOR.
APPLICATION FILED FEB. 10, 1908.
904,277.  Patented Nov. 17, 1908.
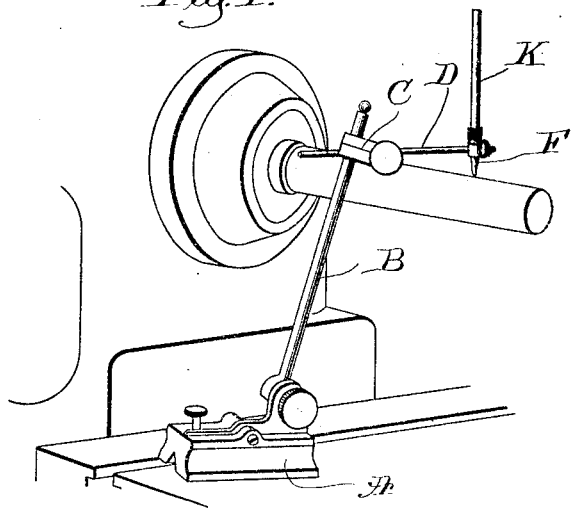
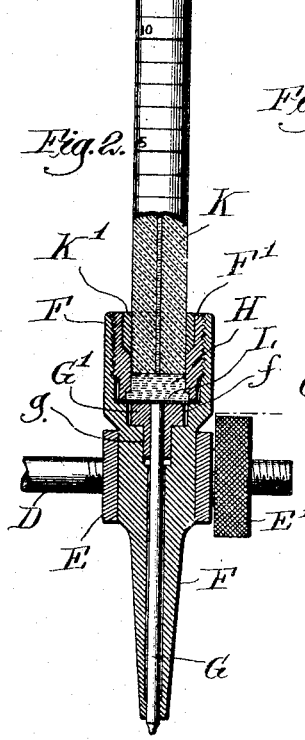
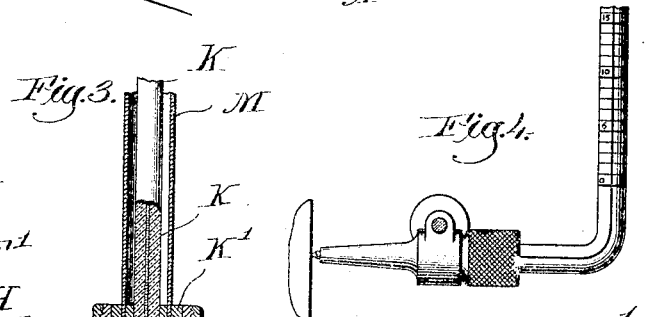
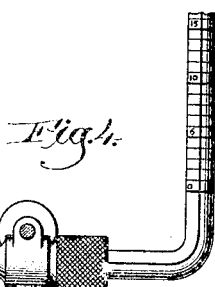
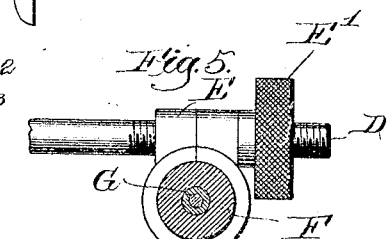
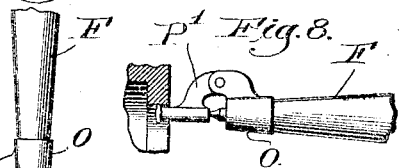
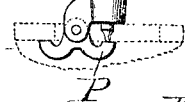

UNITED STATES PATENT OFFICE.

FORREST G. PURINTON, OF BEVERLY, MASSACHUSETTS, ASSIGNOR OF ONE-HALF TO PERLEY R. GLASS, OF BOSTON, MASSACHUSETTS.

LIQUID MICROMETER-INDICATOR.

No. 904,277.  Specification of Letters Patent.  Patented Nov. 17, 1908.

Application filed February 10, 1908. Serial No. 415,058.

*To all whom it may concern:*

Be it known that I, FORREST G. PURINTON, a citizen of the United States, residing at Beverly, in the county of Essex and State of Massachusetts, have invented an Improvement in Liquid Micrometer-Indicators, of which the following description, in connection with the accompanying drawing, is a specification, like letters on the drawing representing like parts.

This invention relates to a micrometer indicator for test gages such as are used by machinists and others in testing with great accuracy a surface or line on the work.

The object of the invention is to provide an indicator which will readily and accurately indicate to the eye very minute differences in the work being tested, and for that purpose makes use of the movement of a liquid in a tube of small bore, as the indicating element.

The invention will more fully appear from the accompanying description and drawings and will be particularly pointed out in the claims.

The drawings represent preferred forms of the indicator and some of its adaptations.

In the drawings, Figure 1 is a view in perspective of a portion of a lathe, a piece of work therein to be tested, an ordinary form of testing gage, and the indicator of the present invention adapted thereto, the supporting rod and clamp also being shown. Fig. 2 is an elevation chiefly in longitudinal vertical cross section of an indicator embodying the invention. Fig. 3 is a longitudinal vertical cross section of a slightly different form. Fig. 4 is an elevation of the lower portion of the indicator embodying this invention showing an adaptation to the testing of vertical or similar surfaces. Fig. 5 is a detail of the supporting rod and clamp. Fig. 6 is a cross section through the tube and casing of the indicator shown in Fig. 3. Fig. 7 is a detail showing the adaptation of a point to the indicator whereby the underneath surfaces of an object may be tested. Fig. 8 is a detail showing the adaptation of a point to the indicator whereby interior surfaces may be tested.

The indicator of the present invention is adapted to be used with any of the well-known forms of surface gages, tool-posts, holders, &c., by which work being operated upon by a lathe, planer, milling machine or in any other form may be tested, and it is therefore unnecessary to describe in detail any of these well-known constructions. In Fig. 1 an ordinary form of surface gage A is shown, provided with the adjustable holder B on which is mounted by means of a clamp C the supporting rod D. It will thus be seen that the supporting rod D by means of the clamp C and the adjustment of the holder B on the base of the surface gage can be placed in any desired position. In the drawings the gage is shown as resting on a flat surface on a lathe bed.

As a suitable means for supporting the indicator of the present invention in position for testing the work the supporting rod D is shown as provided with a clamp E which when set up by the set screw E' locks the base of the indicator fast to the supporting rod D. But it will be obvious that the indicator may be supported in any suitable manner from any suitable gage.

The indicator itself in the form shown in Fig. 2 comprises a base shown as made in two parts F and F'. The lower part of the base F is hollow at its upper end to receive the part F' therein. It is also bored longitudinally and chambered at its upper end at *f* to receive a sliding plunger G, having fast thereto at its upper end a plunger head G'. The bore of the part F is made slightly larger than the plunger G except at the lower end, where it is contracted to provide a bearing for the plunger. The head G' of the plunger is freely movable in the chamber *f* and has a depending portion *g* which has a bearing in the base part *f*. It will thus be seen that the plunger G moves freely and its only bearing points are near its upper and lower ends. The plunger is operated by the point at its lower end which protrudes from the base F and which contacts with the work to be tested. In Figs. 1 to 4 the work contacting point is shown as an integral part of the plunger. The upper part F' of the base is formed at its lower end to present a liquid reservoir H, opened at the bottom and closed partially at the top by the end of the tube K.

A disk L of resilient material, such as rubber, is placed across the bottom of the hollow in the upper end of the part F of the base over the head of the plunger G' and the part F' is screwed into the part F until its lower edge contacts with and locks the disk L against the part F of the base so that the disk L forms the lower wall of the reservoir H.

The tube K is made of glass and provided with a small uniform bore communicating with the reservoir H. The tube is graduated throughout its length in any suitable manner, the graduations indicating for example thousandths of an inch. The tube is held in place in the part F' of the base in any suitable way as by cement K'.

The reservoir H is filled with a suitable liquid, as for example mercury, and when the plunger of the indicator is in its normal position the mercury will fill the reservoir and rise from the point K to the zero point of the graduations. If, now, the plunger G be raised by having its work contacting point brought into contact with the work to be tested the head G' of the plunger will force in the resilient wall of the reservoir H, thus diminishing the size of the reservoir and causing the liquid to rise in the tube and as the irregularity being tested diminishes the plunger will be lowered, correspondingly increasing the size of the reservoir H and lowering the liquid in the tube.

The parts are so proportioned that each increment of movement of the plunger G produces a uniform change in the size of the reservoir, and consequently the graduations on the tube may be made equal, or if the parts are so constructed that there is any variation in the relation between the movement of the plunger and the change of the size of the reservoir, then the graduations on the tube may be calibrated to correspond therewith.

Since the upper end of the tube is open either the indicator must be maintained in such an erect position that the liquid will not run out, or else the resiliency of the disk L must be such as to counterbalance the weight of the liquid. In the case of heavy liquids, such as mercury, the regulating of the disk L so as to counterbalance the weight of the liquid will usually interfere with the free and ready movement of the plunger which is desired for securing very fine and accurate indications. Hence the construction shown in Fig. 3 is provided wherein a light liquid, or a liquid of low specific gravity, may be used.

The construction of Fig. 3 is similar to that already described, save that the lower part of the base is made in two separate parts, F² and F³, screw-threaded together at F⁴. By this means access may be had to the resilient disk L in order to regulate its resiliency so as to counterbalance the weight of the liquid used and prevent the liquid running out from the end of the tube. This regulation may be made in any suitable way, as for example by cutting off the upper end of the part F² against which the head G' of the plunger G rests.

In Figs. 3 and 6 a shell or guard M is shown as surrounding the tube K, and this may be used in any construction of the indicator to protect the glass tube. The shell may be secured in place by the cement K' which holds the tube in place.

When the gage is to be used for testing a vertical surface the tube of the indicator may be bent at right-angles, as indicated in Fig. 4.

When the gage is to be used for testing underneath surfaces a work contacting point, such as illustrated in Fig. 7 may be attached to the lower end of the base of the indicator. This point comprises a socket O with a lever P fulcrumed thereon, one arm of the lever contacting with the surface to be tested and the opposite arm contacting with the plunger.

When the gage is to be used for testing interior surfaces a work contacting point such as shown in Fig. 8 may be attached to the lower end of the plunger. This point is the same in principle, embodying a socket hole and a lever P' of another order.

Having described my invention, what I claim as new and desire to secure by Letters Patent, is:

1. A micrometer indicator for test gages, comprising a base, one part of said base being bored longitudinally, a plunger mounted to slide freely in said base, another part of said base being provided with a chamber, a resilient member between the said base parts adapted when in position to form one wall of said chamber and to be acted upon by the end of said plunger, a graduated tube of small bore attached to the base and communicating with said reservoir, whereby upon the movement of the plunger the liquid is caused to rise and fall in the tube and indicate the extent of movement of the plunger.

2. A micrometer indicator for test gages, comprising a base, one part of said base being bored longitudinally, a plunger mounted to slide freely in said bore and provided with a head, another part of said base being provided with a chamber, a resilient disk between the said base parts adapted when in position to form the lower wall of said chamber and to be acted upon by said plunger head, a graduated tube of small bore attached to the base and communicating with said reservoir, whereby upon the movement of the plunger the liquid is caused to rise and fall in the tube and indicate the extent of movement of the plunger.

3. A micrometer indicator for test gages, comprising a base, one part of said base being bored longitudinally, the said bore at its lower end being of less diameter than at its central portion to form a bearing and being of larger diameter at its upper end than at its central portion to form a second bearing, a plunger provided with a head the lower end of the plunger sliding on the bearing at the lower end of the tube and the head of the plunger sliding in the bearing at the upper end of the tube, another part of said base being provided with a chamber, a resilient disk between the said base parts adapted when in position to form the lower wall of said chamber and to be acted upon by said plunger head, a graduated tube of small bore attached to the base and communicating with said reservoir, whereby upon the movement of the plunger the liquid is caused to rise and fall in the tube and indicate the extent of movement of the plunger.

In testimony whereof, I have signed my name to this specification, in the presence of two subscribing witnesses.

FORREST G. PURINTON.

Witnesses:
 MABEL PARTELOW,
 EDWARD F. ALLEN.